United States Patent [19]

Szereto et al.

[11] Patent Number: 4,810,464

[45] Date of Patent: Mar. 7, 1989

[54] IRON-BASE HARD SURFACING ALLOY SYSTEM

[75] Inventors: Richard S. Szereto, Coraopolis; Richard O. Drossman, Aliquippa, both of Pa.

[73] Assignee: Wear Management Services, Aliquippa, Pa.

[21] Appl. No.: 48,555

[22] Filed: May 11, 1987

[51] Int. Cl.⁴ .............................................. C22C 38/08
[52] U.S. Cl. ...................................... 420/97; 420/98; 420/94; 420/584; 420/452; 75/254
[58] Field of Search .................................. 420/97–100, 420/584, 452, 459; 75/245, 246, 254

[56] References Cited

U.S. PATENT DOCUMENTS

| | | | |
|---|---|---|---|
| 2,875,043 | 2/1959 | Tour | 420/584 |
| 4,402,742 | 9/1983 | Pattanaik | 420/97 |
| 4,690,711 | 9/1987 | Coad | 420/97 |

FOREIGN PATENT DOCUMENTS 53-34634  3/1978  Japan ................................. 420/584

OTHER PUBLICATIONS

Lula et al., "Residual and Minor Elements in Stainless Steels," *Metallurgy of Stainless Steels*, pp. 14–1 to 14–2.

Primary Examiner—Deborah Yee
Attorney, Agent, or Firm—Pearne, Gordon, McCoy & Granger

[57] ABSTRACT

An iron-base, hard facing alloy characterized by the absence of cobalt but having performance characteristics approximating cobalt-base, hard surfacing alloys. The alloys consist essentially of, by weight, from about 3% to about 5% boron, up to about 10% chromium, from about 27% to about 43% nickel, from about 0.1% to about 5% silicon, from about 0.2% to about 1.5% carbon, from about 0.1% to about 2% manganese, with iron comprising the balance.

7 Claims, No Drawings

IRON-BASE HARD SURFACING ALLOY SYSTEM

BACKGROUND OF THE INVENTION

This invention relates to hard surfacing alloys and, particularly, to iron-base alloys which are cobalt-free and which utilize relatively high levels of nickel and low levels of chromium and boron.

Hard facing is essentially a welding process which forms an alloy surface on a base metal to provide a wear-, heat-, and corrosion-resistant surface for the base metal. Hard facing is used where it is difficult to lubricate the base metal against abrasion or to provide a wear-resistant surface where it is impractical or impossible to harden the surface by conventional heat treating or heat hardening metallurgical techniques. Alloys employed as hard facing materials range from low-cost ferrous material to relatively expensive nickel-, cobalt-, or tungsten-base alloys.

Generally, the hard facing alloys may be classified as low alloy ferrous materials, high alloy ferrous materials, nickel-base alloys, cobalt-base alloys, and tungsten carbide. The low alloy ferrous materials include chromium as the chief alloying constituent in amounts ranging from 1% to 7%, with relatively small amounts of manganese, molybdenum, silicon, and carbon. The high alloy ferrous materials include chromium in amounts up to 15%, with significant amounts of molbydenum and/or manganese. The nickel-base alloys include between 70% and 80% nickel and between 10% and 17% chromium. The cobalt-base alloys have between 45% and 65% cobalt, between 20% and 30% chrome, and between 5% and 50% tungsten.

A widely used hard facing alloy is a high alloy ferrous material utilizing high levels of chromium and carbon (10%–30% and 2%–4% by weight, respectively). These alloys generally depend upon phase transformation and/or formation of acicular chromium carbides for their resistance to wear. At the higher levels of chromium, some increased resistance to corrosive attack can also be noted, despite the elevated levels of carbon normally associated with these materials. These alloys are intended as substitutes for cobalt-base alloys, where high resistance to galling and/or crack-free overlays is required to meet specific service requirements.

While the high chromium, high carbon iron-base alloys form hard, wear-resistant overlays, they have a tendency to crack when applied by the various welding processes. To overcome this problem, additions of cobalt and/or nickel have been made, together with a lowering of the levels of carbon usually employed in these alloys. These efforts have resulted in alloys with satisfactory weldability and lower susceptibility to cracking while retaining some of the performance characteristics of the more expensive cobalt-base materials. These modifications, however, have not significantly increased the resistance to galling of these alloys.

In addition, since the sources for cobalt are quite limited, and this element is extensively used in the aerospace industry, cobalt is considered to be a strategic material. This condition, when coupled with the price pressure of cobalt, has led to efforts to develop alloys which retain the performance characteristics of the cobalt-base alloys while using little or none of this element. An example of such an effort is set forth in U.S. Pat. No. 4,259,111, which relates to a nickel-base alloy containing chromium, silicon, and molybdenum.

SUMMARY OF THE INVENTION

In accordance with one aspect of this invention, there is provided an alloy which meets many of the performance criteria of the cobalt-base materials, including resistance to galling and cracking. This alloy system consists of nickel, chromium boron, carbon silicon, manganese, and iron, wherein the elements are present in the following amounts by weight: nickel, from about 27% to about 43%; chromium, up to about 10%; boron, from about 3% to about 5%; carbon, from about 0.2% to about 1.5%; silicon, from about 0.15% to about 5% manganese, from about 0.1% to about 2%; and iron, balance in amounts greater than 43%. A particularly useful alloy within this system consists of, by weight, from 0.8% to 1.2% chromium; from 0.6% to 1.1% carbon; from 0.1% to 0.2% silicon; from 0.3% to 0.4% manganese; from 2.9% to 3.1% boron from 29% to 31% nickel; and the balance iron, wherein iron is present in amounts exceeding 60% by weight of the alloy. The level of carbon used is chosen within the stated limits to yield a hardness commensurate with the intended application or use.

DETAILED DESCRIPTION OF THE INVENTION

The alloys according to the invention may be prepared by conventional powder metallurgy techniques to produce powders capable of being consolidated into wire, rod, or ingot form. The powders can also be used directly as hard-surfacing coatings utilizing either metal spray or welding techniques. The powders may also be used for powdered metal fabrication by well known pressing and sintering techniques.

Boron is present in the alloys of this invention in an amount from about 3% to about 5% by weight. Boron lowers the liquidus temperature of the alloys at these levels as well as forming carbides when certain alloys of the invention are applied as welded overlays.

Chromium is present in the alloys of this invention in amounts up to 10% by weight. Chromium is used to impart some corrosion resistance to the coated external surfaces of hard-surfaced parts. Nickel is present in the alloys of this invention in amounts of from about 27% to about 43% by weight.

Nickel enhances the corrosion resistance of the alloys of this invention while also imparting toughness and ductility to the welded hard surfacing. This, in turn, lessens brittleness and enhances edge retention during subsequent machining operations, as well as in most cases where a hard-surfaced part is to be used in the as-welded state.

Silicon is present in the alloys of this invention in amounts of from about 0.15% to about 5% by weight. Silicon lowers the melting point of iron and also acts as a deoxidizer during the welding process.

Carbon is present in the alloys of this invention in amounts of from about 0.2% to about 1.5% by weight. The amount of carbon specified for a particular alloy of this invention has a direct bearing on the resulting macro-hardness of the particular alloy and, hence, determines that alloy's suitability for a specific hard-surfacing application.

Manganese is present in the alloys of this invention in amounts of from about 0.1% to about 2% by weight. Its use is primarily as a deoxidizer and inhibitor of hot cracking during weld surfacing with alloys of this invention.

In order to more fully demonstrate the subject matter of this invention, the following detailed examples are presented.

EXAMPLE 1

A fine powder alloy consisting, by weight, of about 1% chromium and about 0.6% carbon, about 0.15% silicon, and about 0.35% manganese, about 3% boron, about 30% nickel, and about 64.9% iron, was prepared using standard atomization techniques. A plasma-transferred arc surfacing grade powder was prepared from the atomized powder.

A feedscrew of the type used to transport material in an injection molding machine was overlaid on the surfaces of its flights, using standard plasma-transferred arc surfacing techniques and operating parameters. Satisfactory welding characteristics, including good wetting properties, ease of bead configuration control, and good flowability were observed. The resulting overlay conforms to normally accepted standards of industry for this type of hard surfacing applications.

Following subsequent finished machining operations using standard industry practices, the feedscrew was put into service and wear characteristics were observed which were equal to those exhibited by cobalt-base hard surfacing alloys, including a total lack of evidence of galling.

EXAMPLE 2

A fine powder alloy consisting, by weight, of about 7.7% chromium, about 0.8% carbon, about 1.9% silicon, about 0.2% manganese, about 3.7% boron, about 39.7% nickel, and about 36% iron, was prepared using standard atomization techniques. An oxygen acetylene puddle spray torch grade powder was prepared from the above-mentioned atomized powder.

A worn metal shear blade edge was rebuilt using a conventional oxygen acetylene puddle spray torch with standard practices and techniques. Satisfactory oxygen acetylene puddle spray torch welding characteristics, such as good wetting properties and flowability, coupled with sufficient puddle stiffness for retention of bead configuration, were observed. A satisfactory, well bonded, crack and porosity-free overlay was observed.

Following subsequent machining operations using conventional grinding techniques, the restored metal shear blade was returned to service and was observed to perform equal to a blade restored with an overlay of a comparable cobalt-base alloy.

EXAMPLE 3

A fine powder alloy consisting, by weight, of about 1% chromium, about 1.1% carbon, about 0.15% silicon, about 0.35% manganese, about 3% boron, about 30% nickel, and about 64.4% iron, was prepared using standard atomization techniques. An oxygen acetylene metal powder spray torch grade powder was prepared from the atomized powder.

A worn feedscrew coupler rod was prepared for powder metal spray using standard practices commonly accepted by the industry. A coating of the above-mentioned powder alloy was sprayed onto the prepared coupler rod using a standard oxygen acetylene metal powder spray torch following standard practices, techniques and parameters commonly accepted by industry. A satisfactory coating exhibiting no signs of cracking, spalling, or lack of bond was observed.

Following subsequent finishing machining using conventional tooling and/or grinding techniques, the restored coupler rod was returned to service and was observed to perform equal to a coupler rod restored with a comparable cobalt-base alloy.

EXAMPLE 4

A cast alloy rod consisting, by weight, of about 1.2% chromium, about 1% carbon, about 0.14% silicon, about 0.1% manganese, about 3% boron, about 30.3% nickel, and about 64.3% iron, was prepared using standard alloy rod casting techniques.

A worn earth auger of the type used to bore holes in soil for the setting of poles or the like was prepared for weld hard surfacing in accordance with accepted practices in industry. A hard surface overlay was deposited onto the prepared worn area using a manual oxygen acetylene welding torch to melt and flow the alloy rod onto the surface of the auger. Satisfactory welding characteristics, such as good wetting properies, good flowability, and ease of bead configuration control, were observed.

Upon completion of the overlay process, the restored auger was returned to service in the as-welded condition and was observed to perform equal to an auger restored with a comparable cobalt-base alloy.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. An iron-base hard surfacing alloy characterized by the absence of cobalt and having performance characteristics approximating comparable cobalt-base alloys, consisting essentially of, by weight, from about 3% to about 5% boron, up to about 10% chromium, from about 27% to about 43% nickel, from about 0.1% to about 5% silicon, from about 0.2% to about 1.5% carbon, from about 0.1% to about 2% manganese, with iron comprising the balance, and in amounts greater than 43%, said alloy being further characterized by resistance to galling and hot cracking.

2. An alloy according to claim 1, wherein said alloy consists of, by weight, about 1% chromium, about 0.6% carbon, about 0.15% silicon, about 0.35% manganese, about 3% boron, about 30% nickel, and about 64.9% iron.

3. An alloy according to claim 1, wherein said alloy consists of about 7.7% chromium, about 0.8% carbon, about 1.9% silicon, about 0.2% manganese, about 3.7% boron, about 39.7% nickel, and about 46% iron.

4. An alloy according to claim 1, wherein said alloy consists of about 1% chromium, about 1.1% carbon, about 0.15% silicon, about 0.34% manganese, about 3% boron, about 30% nickel, and about 64.4% iron.

5. An alloy according to claim 1, wherein said alloy contains about 1% chromium, about 1% carbon, about 0.15% silicon, about 0.35% manganese, about 3% boron, about 30% nickel, and about 64.9% iron.

6. An alloy according to claims, 1, 2, 3, 4, or 5, wherein said alloy is in the form of a powder.

7. An alloy according to claim 5, wherein said alloy is in the form of a cast alloy rod.

* * * * *